United States Patent
Hattori et al.

(10) Patent No.: US 6,791,763 B2
(45) Date of Patent: Sep. 14, 2004

(54) MOLDED COUPLING LENS

(75) Inventors: Hiroyuki Hattori, Hachioji (JP); Hiroyuki Yamazaki, Hachioji (JP)

(73) Assignee: Konica Corporation, Tokyo (JP)

( * ) Notice: Subject to any disclaimer, the term of this patent is extended or adjusted under 35 U.S.C. 154(b) by 120 days.

(21) Appl. No.: 10/073,308

(22) Filed: Feb. 13, 2002

(65) Prior Publication Data

US 2002/0114085 A1 Aug. 22, 2002

(30) Foreign Application Priority Data

Feb. 20, 2001 (JP) .................................. 2001-043132

(51) Int. Cl.[7] .................................................. G02B 7/00
(52) U.S. Cl. .................. 359/719; 359/808; 369/112.23; 369/44.23
(58) Field of Search .............................. 359/642, 718, 359/719, 804, 808, 811, 814, 824; 369/112.23, 44.11, 44.12, 44.13, 44.14, 44.23

(56) References Cited

U.S. PATENT DOCUMENTS 6,437,928 B2 * 8/2002 Togashi ...................... 359/811
6,510,121 B2 * 1/2003 Ijima et al. .................. 369/247

* cited by examiner

Primary Examiner—Scott J. Sugarman
Assistant Examiner—Darryl J. Collins
(74) Attorney, Agent, or Firm—Finnegan, Henderson, Farabow, Garrett & Dunner, L.L.P.

(57) ABSTRACT

A molded coupling lens, for use in an optical pickup apparatus, comprises: a first surface including a first optical surface, a second surface located opposite to the first surface and including a second optical surface, and a flat surface section provided substantially in parallel with a plane including an optical axis of the molded coupling lens so as to connect the first surface and the second surface. An outer peripheral shape of the first optical surface is a circle.

6 Claims, 11 Drawing Sheets

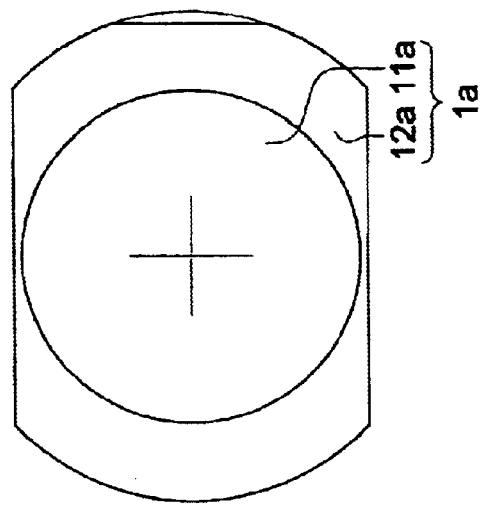
FIG. 2(c)
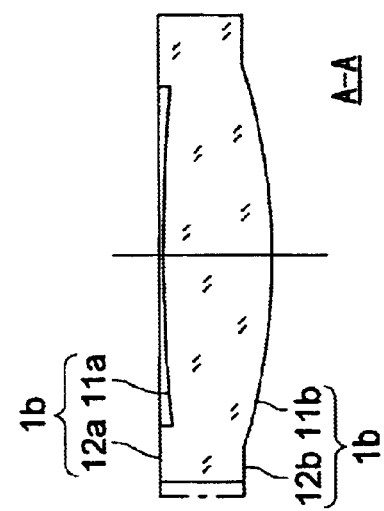
FIG. 2(e)
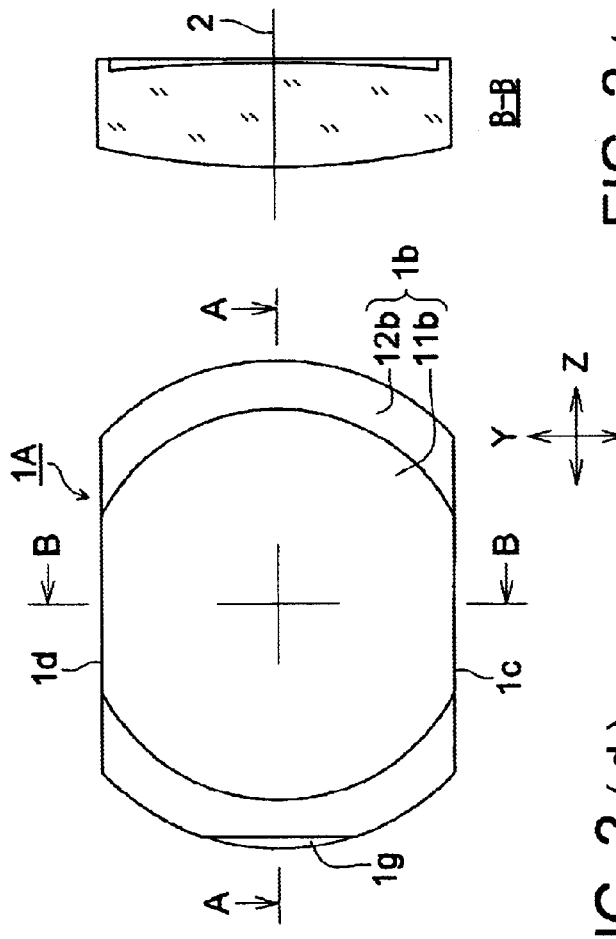
FIG. 2(a)
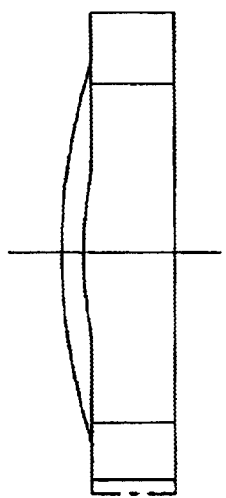
FIG. 2(b)
FIG. 2(d)

CORE

A-A

MOLDED COUPLING LENS

BACKGROUND OF THE INVENTION

The present invention relates to a molded lens, a metal mold for a molded lens, a manufacturing method of a molded lens and an optical pickup device.

Prior Art 1

As a molded lens, there has been known a lens which is equipped with a first surface having a first optical surface whose outer circumference is not circular and a second surface having a second optical surface whose outer circumference is not circular, and further has one or two flat portions each being almost in parallel with a plane including an optical axis of the molded lens.

Prior Art 2

As a metal mold for a molded lens, there has been known a metal mold for a molded lens which molds a molded lens that is equipped with a first surface having a first optical surface and a second surface having a second optical surface, and has one or two flat portions each being almost in parallel with a plane including an optical axis of the molded lens.

Prior Art 3

As a manufacturing method of a molded lens, there has been known a method for manufacturing a molded lens which is equipped with a first surface having a first optical surface and a second surface having a second optical surface, and further has one or two flat portions each being almost in parallel with a plane including an optical axis of the molded lens.

Prior Art 4

There has been known an optical pickup device constituted by a semiconductor laser, a coupling lens, a mirror and an objective lens all arranged in this order from the light source side wherein the coupling lens including a collimator lens which converges divergent light into mostly parallel light has a first surface having a first optical surface and a second surface having a second optical surface both arranged in this order from the light source side, and a flat portion that is almost in parallel with a plane including an optical axis is not provided, and an outer flank of the optical pickup device is circular.

However, as a problem awaiting solution in (Prior art 1), it is demanded, when applying as a coupling lens of an optical pickup device for example, that a precision of astigmatism is not more than 0.02 (or 0.03) λrms in terms of transmission wavefront aberration. Incidentally, λ is a wavelength of a semiconductor laser representing a light source, and when an optical information recording medium is DVD, for example, λ equals 650 nm, while, in the case of CD, λ equals 780 nm. If a flat portion is provided on an optical surface of each of a first surface and a second surface of a molded lens, an internal strain generated in the course of molding process makes it difficult to satisfy the demanded precision stated above, which is a problem.

A first object of the invention is to provide a molded lens which is small in size in the direction perpendicular to an optical axis, and has an excellent optical precision and less astigmatism in particular.

As a problem awaiting solution in (Prior art 2), it is difficult for a metal mold for a molded lens having a flat portion that is almost in parallel with a plane including an optical axis of the molded lens to manufacture a highly accurate molded lens.

A second object of the invention is to provide a metal mold which is for a molded lens and can mold easily a molded lens that is small in size in the direction perpendicular to an optical axis, and is highly accurate and excellent in terms of astigmatism, in particular.

As a problem awaiting solution in (Prior art 3), it is difficult to mold accurately a molded lens having a flat portion that is almost in parallel with a plane including an optical axis of the molded lens, because a part of an optical surface has a straight portion, which is a problem.

A third object of the invention is to provide a manufacturing method for a molded lens that can mold a molded lens that is small in size in the direction perpendicular to an optical axis, and is highly accurate and excellent in terms of astigmatism, in particular.

As a problem awaiting solution in (Prior art 4), a height of a coupling lens for a light source used for an optical pickup device in the direction perpendicular to an optical information recording medium is great and a height of the whole optical pickup device is also great accordingly, which is a problem.

A fourth object of the invention is to provide an optical pickup device equipped with a coupling lens that is low in terms of a height in the direction perpendicular to an optical information recording medium and is highly accurate.

SUMMARY OF THE INVENTION

The first object of the invention mentioned above is attained by either one of the following structures.

(1) A molded lens provided with a first surface having a first optical surface and a second surface having a second optical surface being located on the opposite side of the first surface, wherein a first flat portion that is almost in parallel with a plane including an optical axis of the molded lens is provided and an outer circumference of the first optical surface is circular, or, the first flat portion is provided and further a second flat portion is provided to be positionally symmetrical with the first flat portion about the aforesaid plane and the outer circumference of the first optical surface is circular.

(2) A molded lens provided with a first surface having a first optical surface and a second surface having a second optical surface being located on the opposite side of the first surface, wherein a first flat portion that is almost in parallel with a plane including an optical axis of the molded lens is provided and optical error in at least the course of molding process is corrected on the aforesaid first optical surface, or, the first flat portion is provided and further a second flat portion is provided to be positionally symmetrical with the first flat portion about the aforesaid plane and optical error in at least the course of molding process is corrected on the aforesaid first optical surface.

The second object of the invention mentioned above is attained by either one of the following structures.

(3) A metal mold for a molded lens provided with a first surface having a first optical surface and a second surface having a second optical surface being located on the opposite side of the first surface, wherein the metal mold molds a molded lens in which a first flat portion that is almost in parallel with a plane including an optical axis of the molded lens is provided and an outer circumference of the first optical surface is circular, or, a molded lens in which the first flat portion is provided and further a second flat portion is provided to be positionally symmetrical with the first flat portion about the aforesaid plane and the outer circumference of the first optical surface is circular.

(4) A metal mold for a molded lens provided with a first surface having a first optical surface and a second surface having a second optical surface being located on the opposite side of the first surface, wherein the metal mold molds a molded lens in which a first flat portion that is almost in parallel with a plane including an optical axis of the molded lens is provided and at least optical errors in the course of molding process are corrected on the first optical surface, or, a molded lens in which the first flat portion is provided and further a second flat portion is provided to be positionally symmetrical with the first flat portion about the aforesaid plane and at least optical errors in the course of molding process are corrected on the first optical surface.

The third object of the invention mentioned above is attained by either one of the following means.

(5) A manufacturing method of a molded lens wherein the molded lens described in (1) is molded by the metal mold for a molded lens described in (3).

(6) A manufacturing method of a molded lens wherein the molded lens described in (2) is molded by the metal mold for a molded lens described in (4).

The fourth object of the invention mentioned above is attained by the following means.

(7) An optical pickup device composed of a semiconductor laser, a coupling lens, a mirror and an objective lens all arranged in this order from the light source side wherein the coupling lens is the molded lens described in (1) or (2), and the first flat portion that is almost in parallel with a plane including an optical axis of the molded lens is mostly in parallel with an image forming surface of the optical information recording medium located at the position where the optical system forms an image.

BRIEF DESCRIPTION OF THE DRAWINGS

FIGS. 2(a) to 2(e) each is a diagram showing each face and a section of primary portions of the molded lens shown in FIG. 1.

DETAILED DESCRIPTION OF THE PREFERRED EMBODIMENT

A molded lens, a metal mold for a molded lens, a manufacturing method of a molded lens and an optical pickup device of the invention will be explained as follows, referring to drawings.

Incidentally, in each drawing, X represents a direction of an optical axis of the molded lens, Y represents a direction that is perpendicular to the optical axis, and Z represents a direction which is perpendicular to both the X-direction and Y-direction.

First Embodiment

Figure 1:
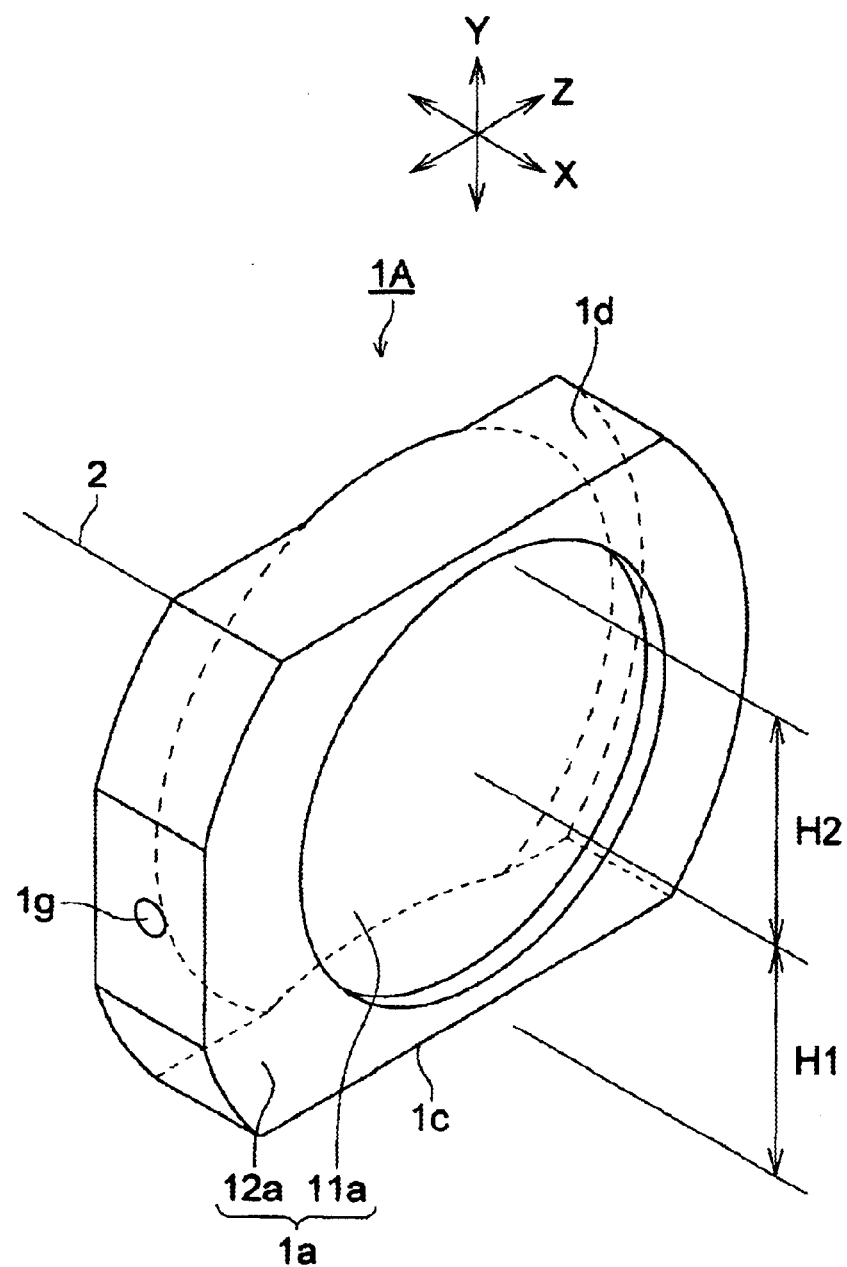
FIG. 1 is a perspective view showing an appearance of a molded lens in the invention.
Figure 3:
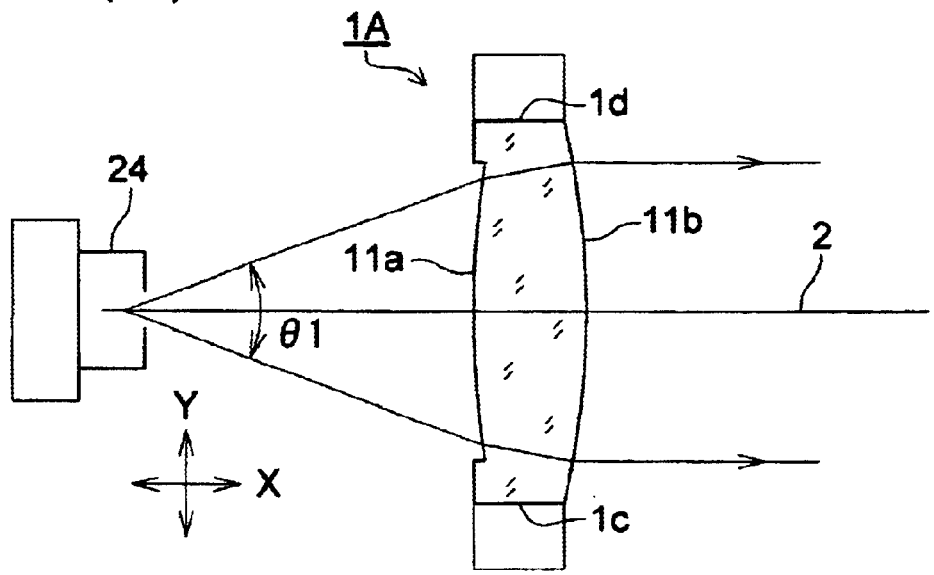
FIGS. 3(a) and 3(b) each is an illustration of a first optical surface and a second optical surface of a molded lens.
Figure 3:
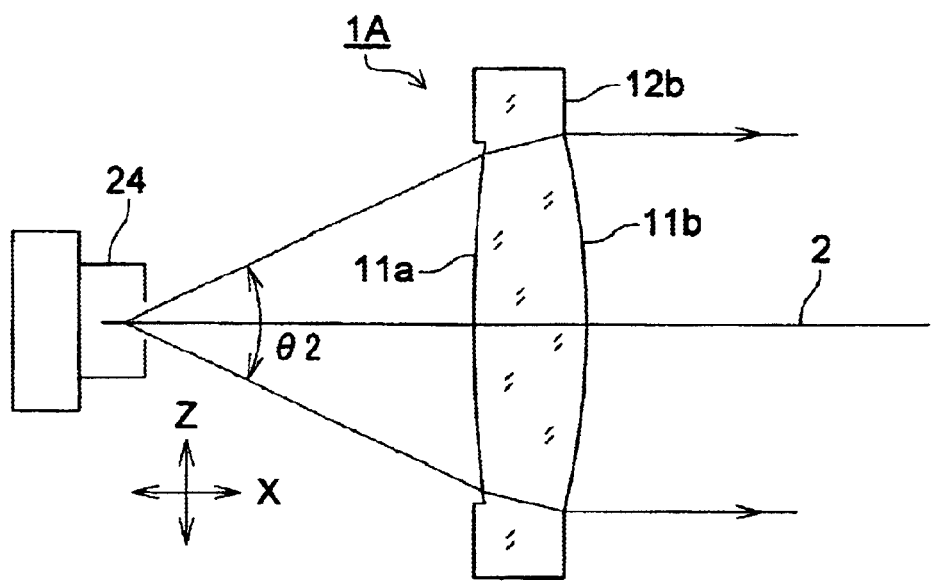

A molded lens in the embodiment will be explained. FIG. 1 is a perspective view showing an appearance of a molded lens and FIG. 2 is a diagram showing each face and sections of primary portions of the molded lens shown in FIG. 1. To be concrete, there are shown a rear side view of the molded lens (a), a sectional view taken on line B—B of the molded lens (b), a front view of the molded lens (c), a bottom face view of the molded lens (d) and a sectional view taken on line A—A of the molded lens (e). FIG. 3 is an illustration for the first and second optical surfaces of the molded lens.

As shown in FIG. 1 and FIG. 2, molded lens 1A is a positive lens that is suitable as a coupling lens for a semiconductor laser. The molded lens 1A has therein first surface 1a having a first optical surface and second surface 1b having a second optical surface that is positioned on the opposite side of the first surface.

The first surface 1a includes first optical surface 11a and outer circumferential surface 12a that represents an outer circumference of the first optical surface, and an outer circumference of the first optical surface 11a is circular. On the first optical surface 11a, optical errors in the course of molding process and errors of a metal mold are corrected. The second surface 1b includes second optical surface 11b and outer circumferential surface 12b that represents an outer circumference of the second optical surface.

Further, the molded lens 1A has first flat portion 1c that is almost in parallel with a plane (in the Z-direction) including optical axis 2 and second flat portion 1d that is positioned to be positionally symmetrical with the first flat portion 1c about the aforesaid plane. Incidentally, in FIG. 1, height H1 shows a distance between optical axis 2 and the first flat portion 1c, and height H2 shows a distance between optical axis 2 and the second flat portion 1d. On the molded lens 1A, pouring gate 1g for the purpose of molding is provided at the position where a plane (in the Z-direction) including optical axis 2 and a side wall of the molded lens 1A cross each other.

In an example of the first optical surface 11a and the second optical surface 11b shown in FIG. 3, the first optical surface 11a is designed optically so that its outer circumference may be circular.

In the Y-direction of the molded lens 1A, a light flux emitted from a semiconductor laser enters a coupling lens representing a molded lens at angle θ1 that is the maximum open angle, as shown in FIG. 3(a). In the Z-direction of the molded lens 1A, on the other hand, a light flux emitted from the semiconductor laser enters a coupling lens at angle θ2 that is the maximum open angle, as shown in FIG. 3(b). Incidentally, θ2 is made to be greater than angle θ1 so that a light flux adjusted by diaphragm (the numeral 26 in FIG. 11) may cope with a change, which will be explained in detail later.

Due to the structure stated above, the molded lens turns out to be a lens suitable for a coupling lens mainly for the semiconductor laser. To be concrete, the first optical surface 11a is made to be circular so that optical errors in the course of molding process and errors in a metal mold may easily be corrected and thereby the molded lens may be highly accurate. Further, the first flat portion 1c can make the height in the direction perpendicular to an optical information recording medium to be small. On the other hand, the second flat portion 1d makes it easy to secure a design space of another structure. In the Z-direction, positional adjustment for a diaphragm makes a beam of light not to be interfered by the molded lens 1A.

Second Embodiment

Figure 4:
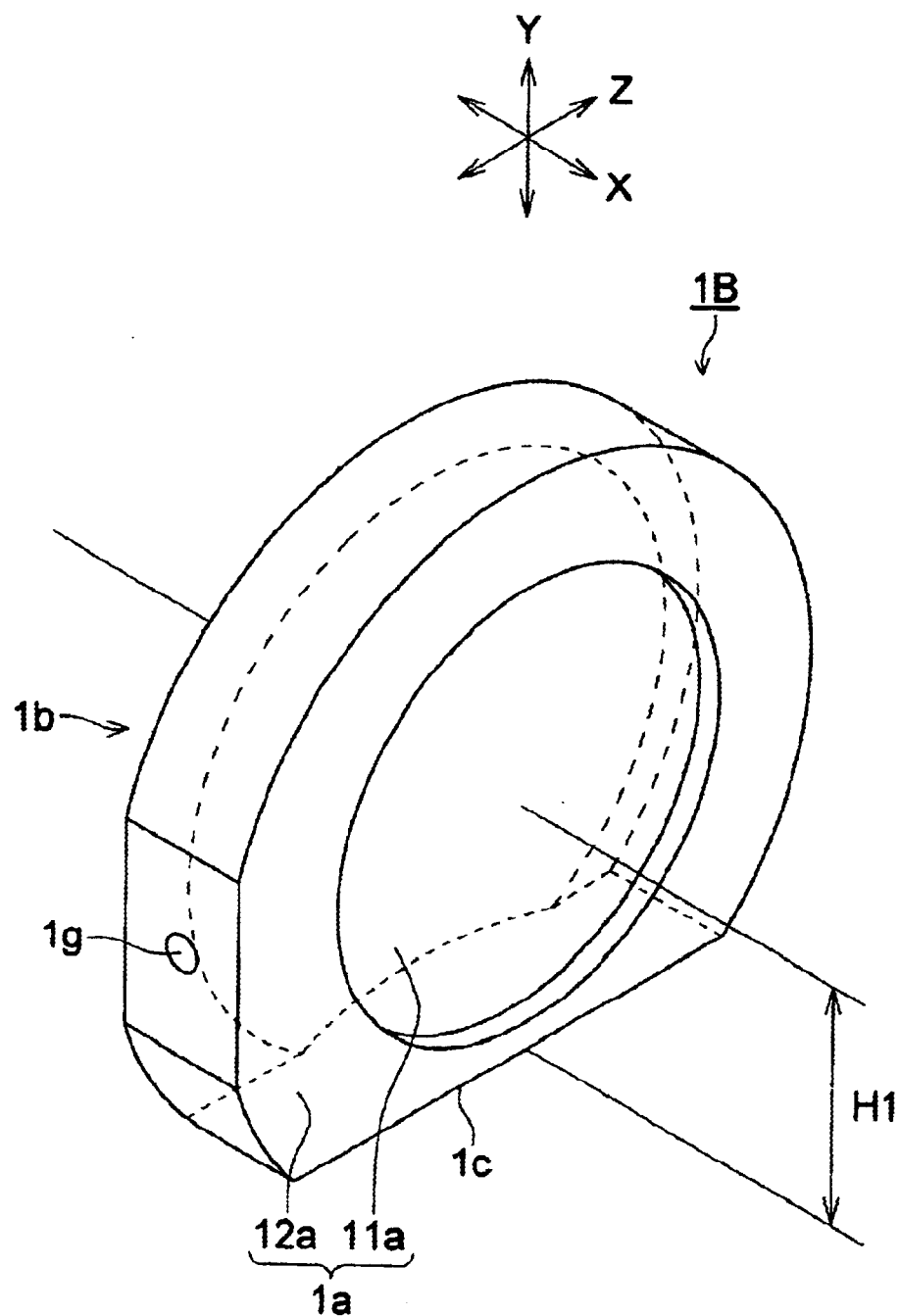
FIG. 4 is a perspective view showing an appearance of another molded lens in the invention.

Another molded lens in the embodiment will be explained. FIG. 4 is a perspective view showing an appearance of another molded lens in the invention.

As shown in FIG. 4, molded lens 1B is a lens having only first flat portion 1c of the aforesaid molded lens 1A. The same portions are given the same symbols, and explanation for them will be partly omitted.

The molded lens 1B is a positive lens that is suitable as a coupling lens mainly for a semiconductor laser. The molded lens 1B has therein first surface 1a having a first optical surface and second surface 1b having a second optical surface that is positioned on the opposite side of the first surface.

The first surface 1a includes first optical surface 11a and outer circumferential surface 12a that represents an outer circumference of the first optical surface, and an outer circumference of the first optical surface 11a is circular. On the first optical surface 11a, optical errors in the course of molding process and errors of a metal mold are corrected.

Due to the structure stated above, the molded lens 1B turns out to be a lens suitable for a coupling lens mainly for the semiconductor laser. To be concrete, an outer circumference of the first optical surface 11a is made to be circular so that optical errors in the course of molding process and errors in a metal mold may easily be corrected and thereby the molded lens may be highly accurate. Further, the first flat portion 1c can make the height in the direction perpendicular to an optical information recording medium to be small. In the Z-direction, positional adjustment for a diaphragm makes a beam of light not to be interfered by the molded lens 1B.

Third Embodiment

Figure 5:
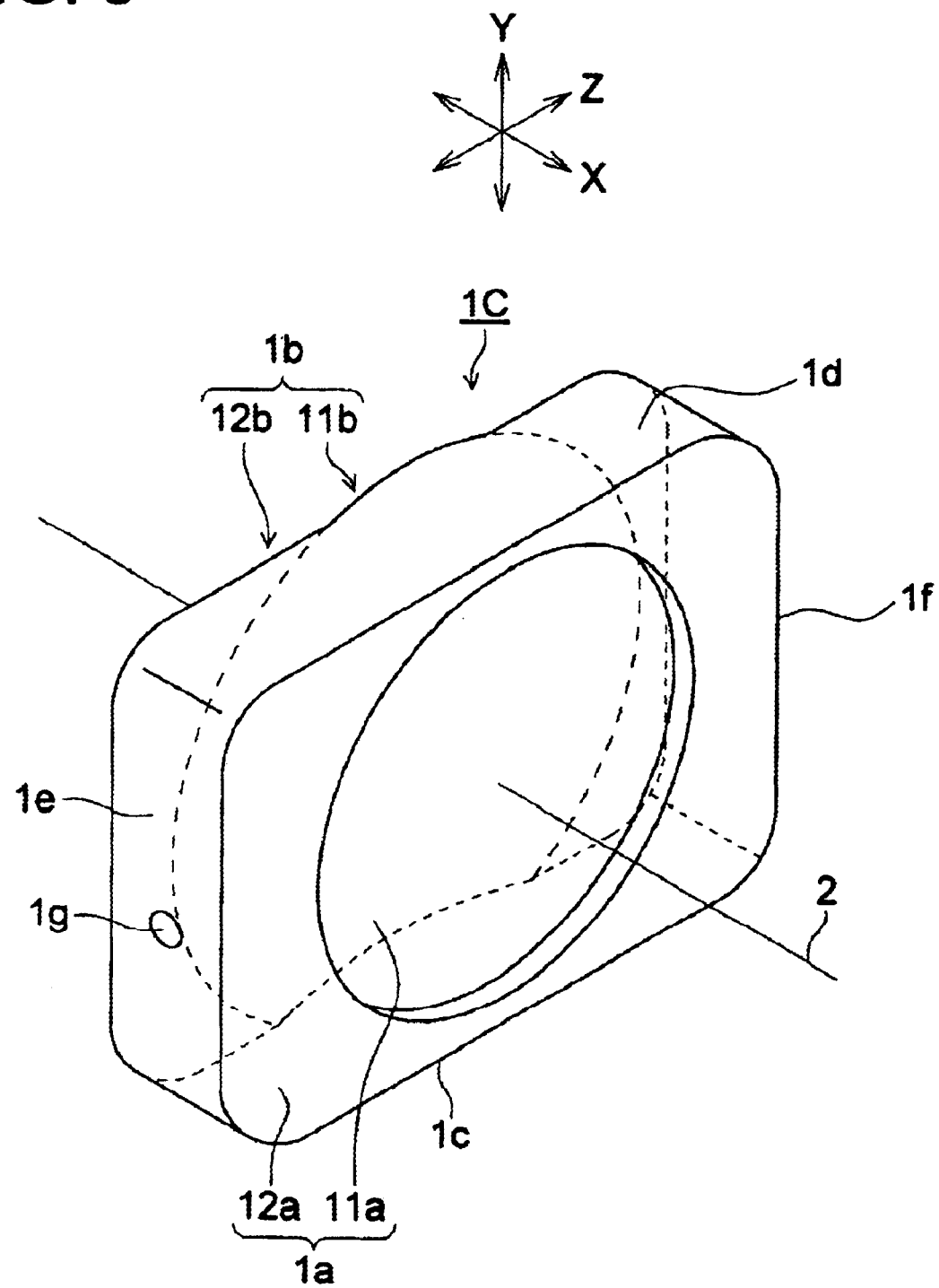
FIG. 5 is a perspective view showing an appearance of still another molded lens in the invention.

Another molded lens in the embodiment will be explained. FIG. 5 is a perspective view showing an appearance of another molded lens in the invention.

As shown in FIG. 5, molded lens 1C is a lens wherein an outer form of the aforesaid molded lens 1A is rectangular. The same portions are given the same symbols, and explanation for them will be partly omitted.

The molded lens 1C is a positive lens that is suitable as a coupling lens mainly for a semiconductor laser. The molded lens 1C has therein first surface 1a having a first optical surface and second surface 1b having a second optical surface that is positioned on the opposite side of the first surface.

The first surface 1a includes first optical surface 11a and outer circumferential surface 12a that represents an outer circumference of the first optical surface, and an outer circumference of the first optical surface 11a is circular. On the first optical surface 11a, optical errors in the course of molding process and errors of a metal mold are corrected.

The second surface 1b includes second optical surface 11b and outer circumferential surface 12b that represents an outer circumference of the first optical surface.

On the molded lens 1C, there are provided first flat portion 1c and second flat portion 1d, and there further are flat portions 1e and 1f in the Z-direction.

Due to the structure stated above, the molded lens turns out to be a lens suitable for a coupling lens mainly for the semiconductor laser. To be concrete, an outer circumference of the first optical surface 11a is made to be circular so that optical errors in the course of molding process and errors in a metal mold may easily be corrected and thereby the molded lens may be highly accurate. Further, the first flat portion 1c can make the height in the direction perpendicular to an optical information recording medium to be small. In the Z-direction, positional adjustment for a diaphragm makes a beam of light not to be interfered by the molded lens 1A.

Fourth Embodiment

Figure 6:
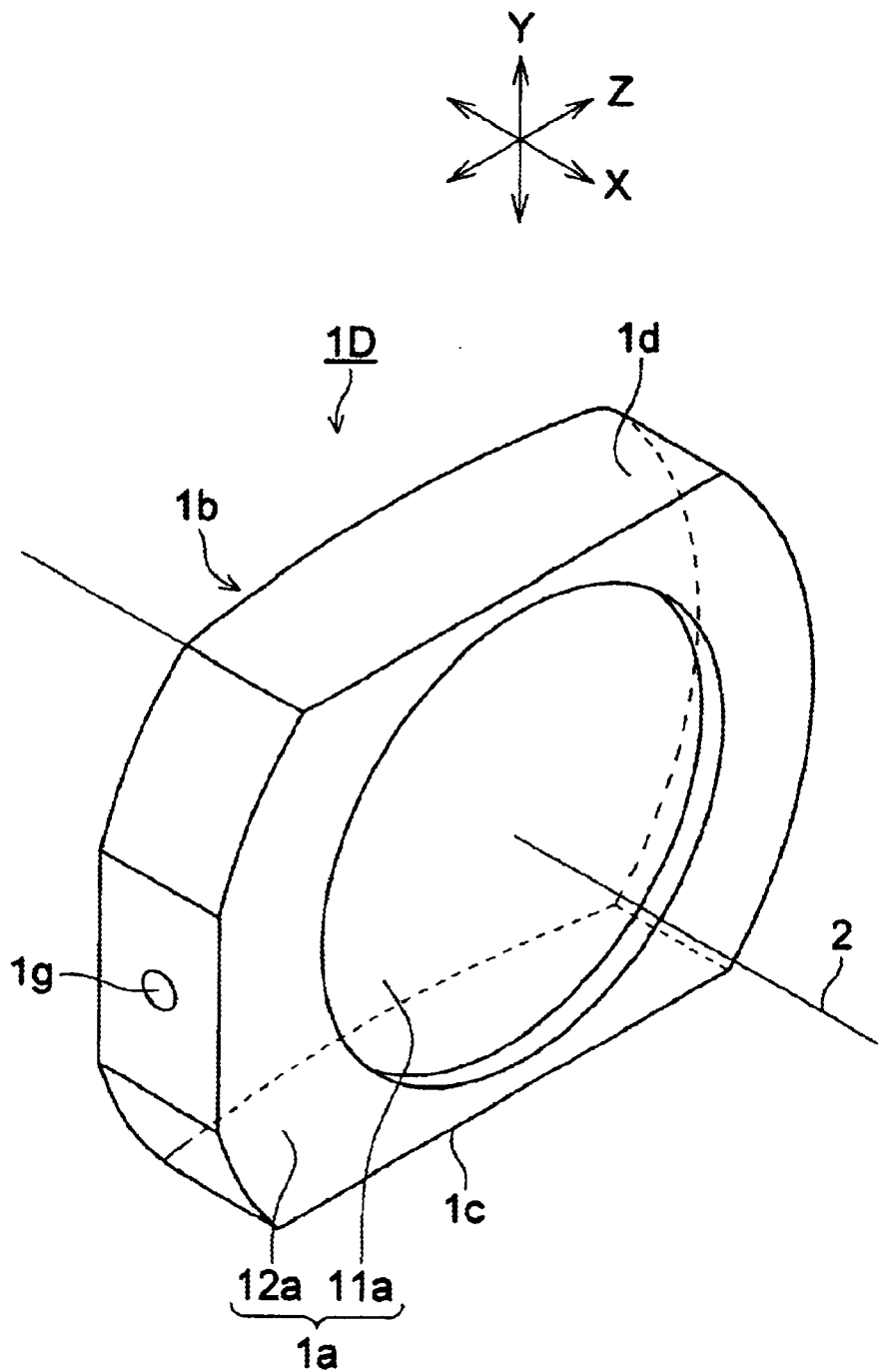
FIG. 6 is a perspective view showing an appearance of still another molded lens in the invention.

Still another molded lens in the embodiment will be explained. FIG. 6 is a perspective view showing an appearance of another molded lens in the invention.

The molded lens 1D is a positive lens that is suitable as a coupling lens mainly for a semiconductor laser, as shown in FIG. 6.

The molded lens 1D has therein first surface 1a having a first optical surface and second surface 1b having a second optical surface that is positioned on the opposite side of the first surface 1a. The first surface 1a includes first optical surface 11a and outer circumferential surface 12a that represents an outer circumference of the first optical surface, and optical errors in the course of molding process and errors of a metal mold are corrected on the first optical surface 11a. The second surface 1b is a surface positioned on the opposite side of the first surface 1a, and it has only the second optical surface and has no outer circumferential surface. On the molded lens 1D, there are formed first flat portion 1c and second flat portion 1d.

Due to the structure stated above, the molded lens 1D turns out to be a lens suitable for a coupling lens mainly for the semiconductor laser. Further, the first flat portion 1c can make the height in the direction perpendicular to an optical information recording medium to be small. In addition, the second flat portion 1d makes it easy to secure design space of another structure. In the Z-direction, positional adjustment for a diaphragm makes a beam of light not to be interfered by the molded lens 1D. An outer circumference of the first optical surface 11a is made to be circular so that optical errors in the course of molding process and errors of a metal mold may easily be corrected to attain high accuracy.

Here, the metal mold for a molded lens of the invention is composed of a fixed die and a movable die. The metal mold for a molded lens is a metal mold for molding a molded lens of the invention explained in the first through fifth embodiments. The metal mold for a molded lens corrects, on the surface of a core that forms a first optical surface of a molded lens, the optical errors such as astigmatism generated in the course of molding process for molded lenses. The core of the metal mold for a molded lens can be fixed after changing its phase for an optical axis. Further, with regard to the surface form of the core portion of the metal mold for a molded lens forming the first optical surface, there is a difference in a shape of a curve between a first curve on the portion crossing a plane including an optical axis of the molded lens and a second curve on the portion crossing a plane that crosses the aforesaid plane at right angles.

Then, the shape of the metal core formed so as to correct an optical error will be explained.

Figure 7:
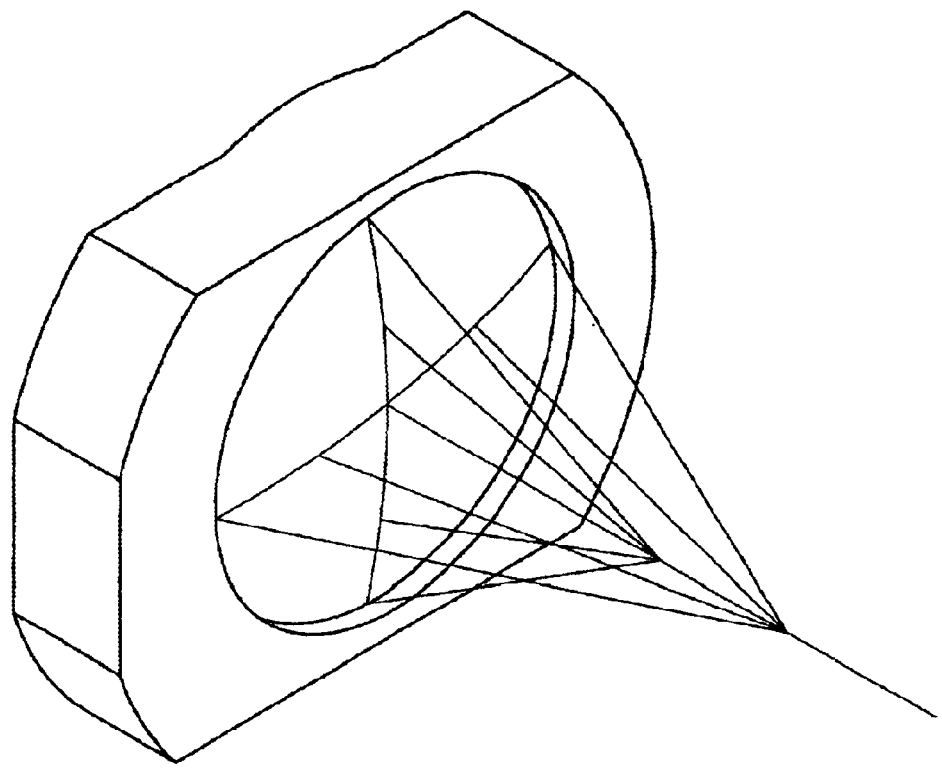
FIG. 7 is a perspective view showing an illustration in which emerging rays are not converged to a point.

In the case of a lens having a flat portion that is almost in parallel with a plane including an optical axis of the lens, it is difficult to achieve optical accuracy because of asymmetrical shrinkage and internal strains of resin in the course of molding processing. In particular, it is difficult to lessen astigmatism. In a word, even if two metal mold cores for molding the first optical surface and the second optical surface respectively are made to be in an axisymmetric shape, when a lens is molded by the use of these metal mold cores, optical surfaces of the lens thus obtained are not axisymmetric optically because of shrinkage and internal strains of resin, and when parallel rays enter the lens, for example as shown in FIG. 7, emerging rays are not converged to a point.

Figure 8:
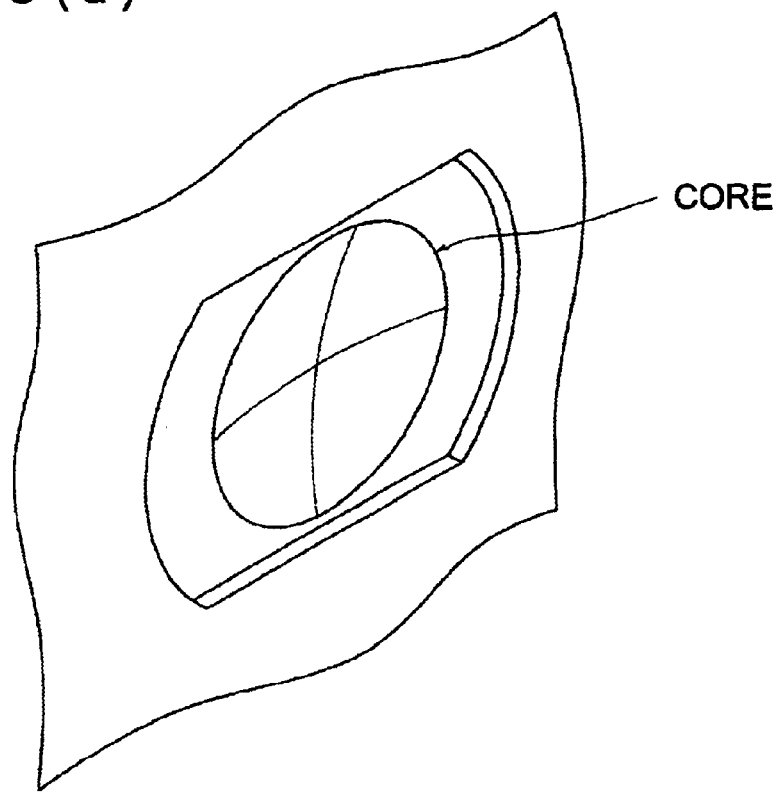
FIGS. 8(a) and 8(b) are illustrations showing metal molds for the first and second optical surfaces.
Figure 8:
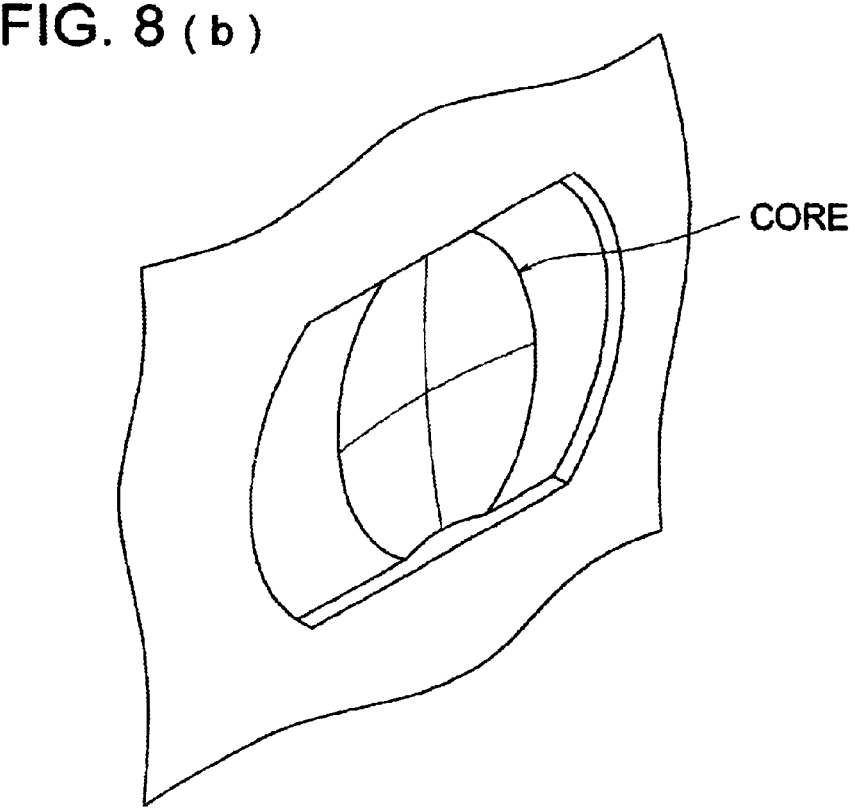

To solve this problem, as shown in FIGS. 8(a) and 8(b), a correction in a form to oppose asymmetry caused in molding processing is provided by making the form of metal mold cores for molding optical surfaces to be axially asymmetric. By using this correction for molding processing, optical accuracy can be achieved on the lens obtained.

This correction in terms of a form for the metal mold core does not always need to be provided for both the first and second optical surfaces, and lens optical accuracy can be obtained by providing correction processing in an amount to oppose asymmetry caused in molding processing for either one optical surface.

Figure 9:
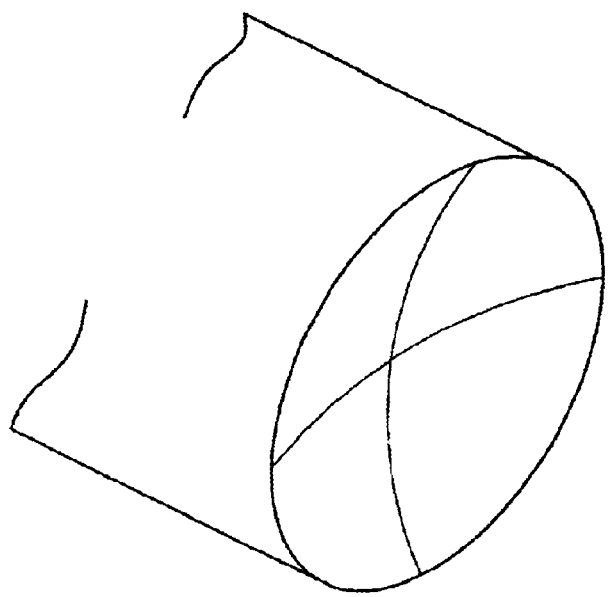
FIGS. 9(a) and 9(b) are illustrations showing metal cores for the first and second optical surfaces.
Figure 9:
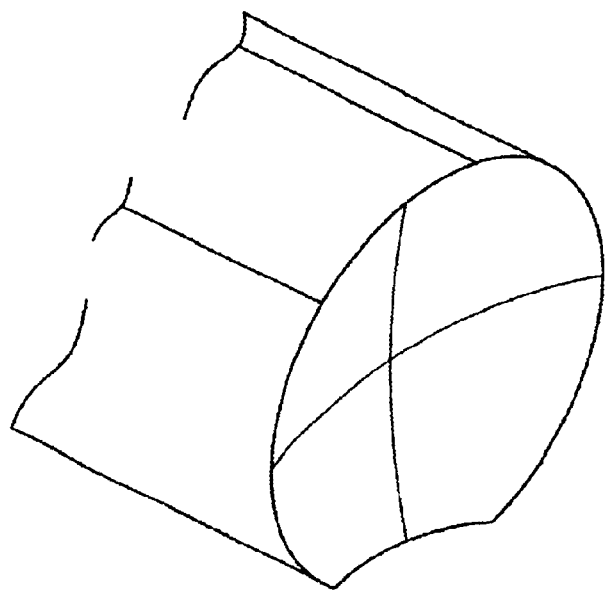

For example, when correcting astigmatism, as shown in FIGS. 9(a) and 9(b), a metal mold core is processed to have astigmatism so that a form of a section of an optical surface of a metal mold core in a plane including an optical axis may be different from that in a plane that is perpendicular to the aforesaid section and includes the optical axis.

Figure 10:
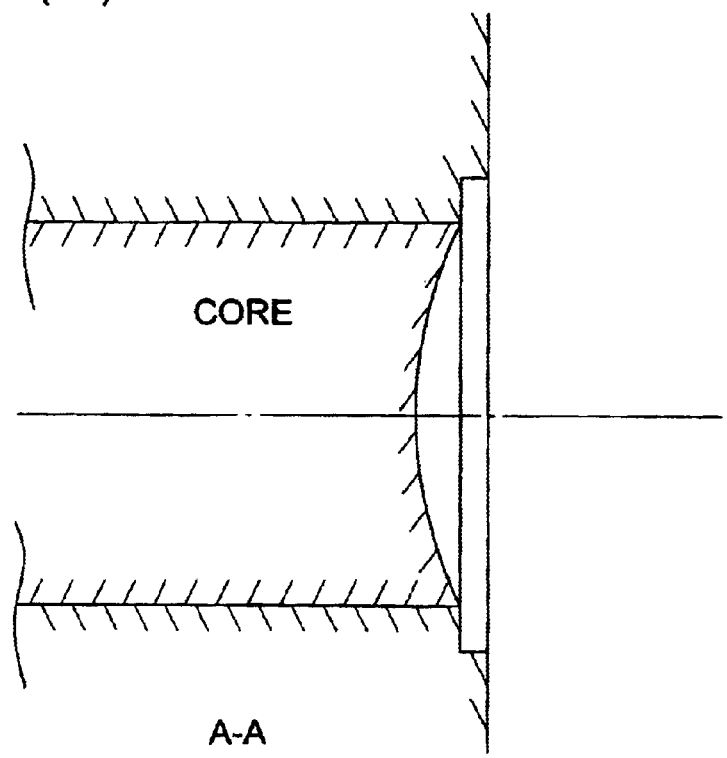
FIGS. 10(a) to 10(c) are illustrations showing a construction of the metal mold and the metal cores.
Figure 10:
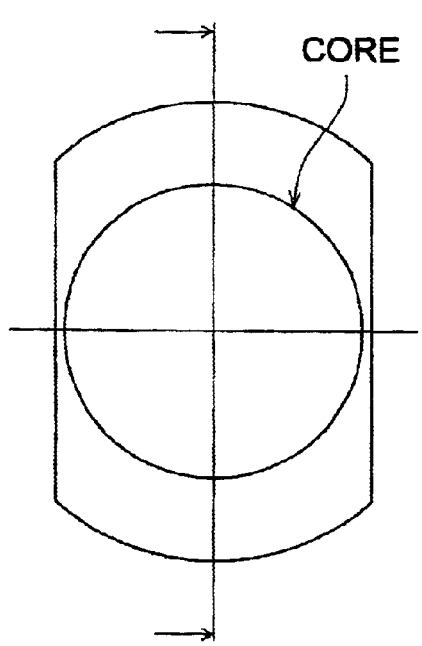
Figure 10:
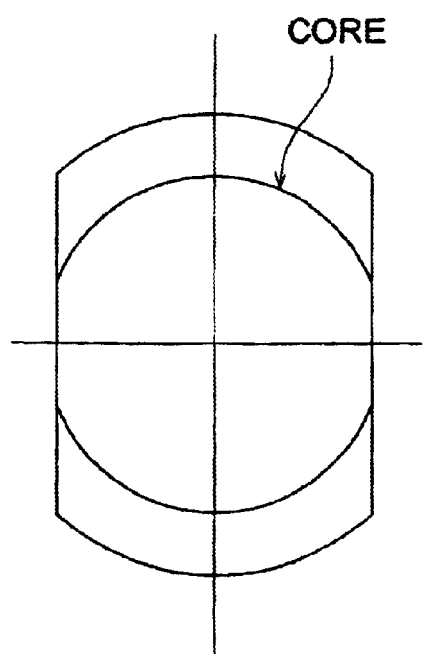

In the correction processing, a high technology is required to process a section of a metal mold core having the greatest curvature or a section having the smallest curvature to the desired position of the metal mold core. In a word, as shown in FIGS. 10(a) to 10(c), if a metal mold core is in a circular form, it can be rotated finely when it is incorporated in a metal mold, thus directional adjustment of astigmatism is possible, resulting in accurate correction, and in processing of the metal mold core, accuracy of positional relationship between the form of a section and the metal mold core is not necessary, which makes the processing to be easy.

Since the direction of asymmetry caused in the course of molding processing varies depending on a lens form and molding conditions, an optically accurate lens can be obtained easily by making a metal mold core to be in a circular form and by rotating it finely to incorporate in a metal mold.

In the manufacturing method of a molded lens of the invention, molded lenses explained in the first through fourth embodiments are manufactured, through molding of plastic materials, by the metal mold for a molded lens explained earlier.

Fifth Embodiment

Figure 11:
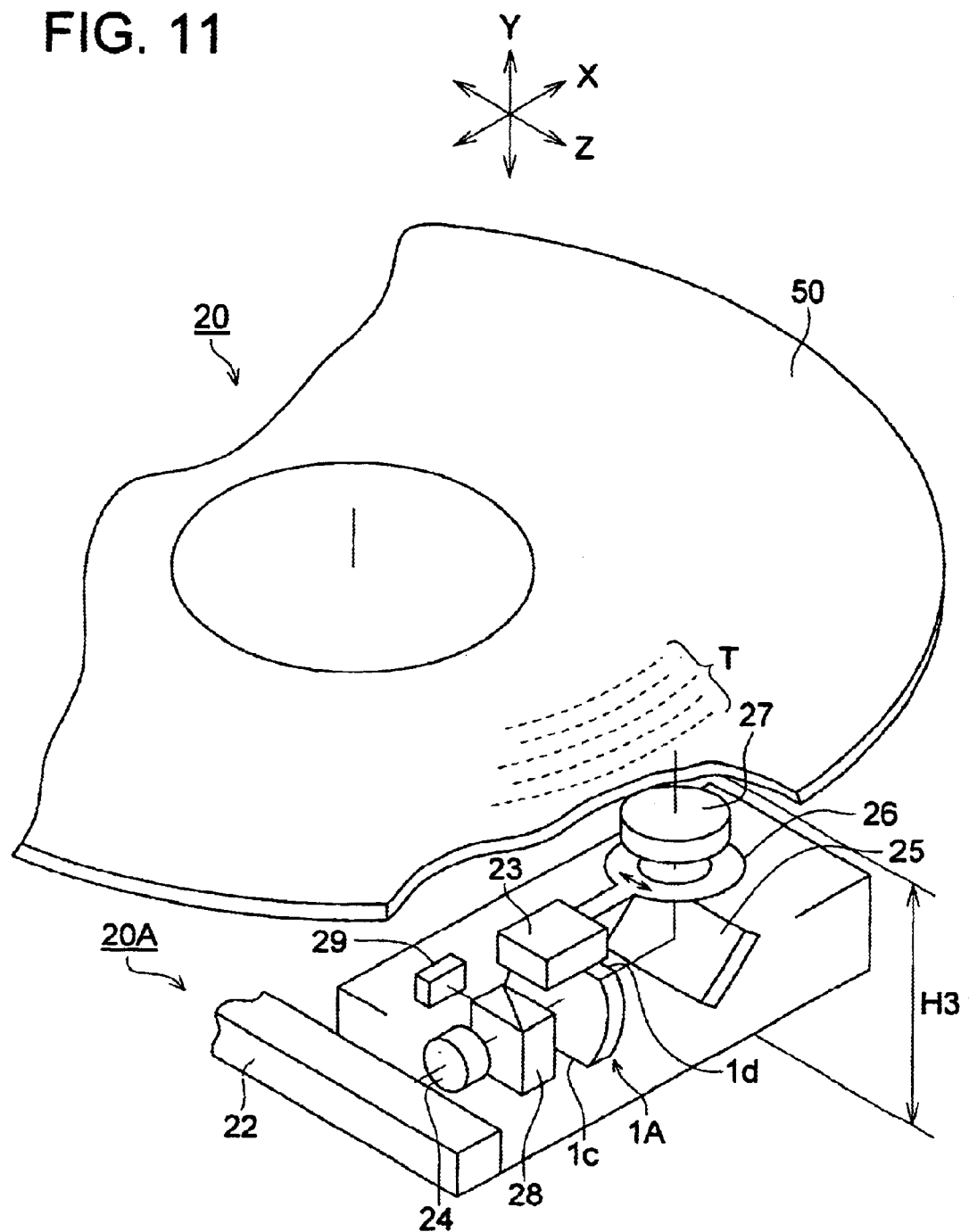
FIG. 11 is a perspective view showing a schematic structure of an optical pickup device of the invention.

An optical pickup device in the embodiment will be explained. FIG. 11 is a perspective view showing a schematic structure of an optical pickup device.

As shown in FIG. 11, optical pickup device 20 is a device for reproducing optical information recording medium 50. The optical pickup device 20 is composed of optical pickup unit 20A and device driving section 22.

The optical pickup unit 20A is composed of optical systems including semiconductor laser 24, branching prism 28, a coupling lens, mirror 25, diaphragm 26 and objective lens 27. The semiconductor laser 24 irradiates in the X-direction. The branching prism 28 has a 45° semitransparent section which transmits a beam of light emitted from the semiconductor laser, and deflects reflected light coming from optical information recording medium 50 by 45° to lead it to light-receiving section 29. The coupling lens representing molded lens 1A is a lens explained in the first embodiment, and it has a first surface and a second surface arranged in this order from the semiconductor laser 24 side, and further has first flat portion 1c and second flat portion 1d. The mirror 25 reflects a light flux in the X-direction to the Y-direction. The diaphragm 26 and the objective lens 27 are adjusted to be in the Z-direction by adjusting mechanism 23. The objective lens 27 converges a light flux to form an image on optical information recording medium 50.The device driving section 22 drives the optical pickup unit 20A in the Z-direction. The optical information recording medium 50 has track T and is rotated by an unillustrated rotating means.

The first flat portion 1c which is mostly in parallel with a plane including an optical axis of molded lens 1A is almost in parallel with an image forming plane of optical information recording medium 50 which is in a position where an optical system forms an image. This first flat portion 1c makes a dimension between the optical axis and the first flat portion 1c to be small. Accordingly, height H3 from the bottom face of the optical pickup device to optical information recording medium 50 can be made small, and the optical pickup device can be made thin and compact accordingly.

Now, main reproduction operations will be explained. A laser beam is irradiated in the X-direction by the semiconductor 24, then, it passes through the branching prism 28 and is converged by the coupling lens and reflected by the mirror 25 in the Y-direction to pass through diaphragm 26, thus, information on track T formed by the objective lens 27 on the optical information recording medium 50 is read Though the diaphragm 26 and objective lens 27 are subjected to fine adjustment in the Z-direction by the adjusting mechanism 23, a beam of light is not interfered because the molded lens 1A has a sufficient width in the Z-direction to cope with a movement of the adjusting mechanism 23.

The optical pickup unit 20A is moved by the device driving section 22 in the Z-direction to read information on track T of the optical information recording medium 50, and it conducts photoelectric transferring with light-receiving section 29 for reproducing.

Incidentally, though the molded lens 1A is used in the embodiment, it is also possible to use molded lens 1B (see FIG. 4) when the upper space of the coupling lens is not needed. Further, though the reproduction has been explained in the embodiment, reproduction and recording or recording only is also acceptable.

Owing to the structure mentioned above, height H3 in the Y-direction perpendicular to optical information recording medium 50 may be made small for optical pickup device 20, and the coupling lens which is highly accurate makes the optical system to be excellent.

The structures stated above exhibit the following effects.

The molded lens of the invention makes a lens which is small in the direction perpendicular to an optical axis and is highly accurate.

The metal mold for a molded lens of the invention makes it easy to mold a molded lens which is small in the direction perpendicular to an optical axis and is highly accurate optically.

The manufacturing method for a molded lens in the invention can manufacture a molded lens which is small in the direction perpendicular to an optical axis and is highly accurate.

The optical pickup device of the invention is one having a coupling lens for a light source which is low in terms of height in the direction perpendicular to an optical information recording medium and is highly accurate optically.

What is claimed is:

1. A molded coupling lens, for use in an optical pickup apparatus, comprising:

a first surface including a first optical surface, a second surface located opposite to the first surface and including a second optical surface, and a flat surface section provided substantially in parallel with a plane including an optical axis of the molded coupling lens so as to connect the first surface and the second surface, wherein an outer peripheral shape of the first optical surface is a circle and the outer peripheral shape of the second optical surface is a circular arc having a diameter larger than that of the first optical surface.

2. The molded coupling lens of claim 1, further comprising:

a second flat surface section located opposite to the flat surface section and provided substantially in parallel with a plane including an optical axis of the molded coupling lens so as to connect the first surface and the second surface, wherein the circular arc-shaped outer peripheral surface of the second optical surface is cut out by the second flat surface section.

3. The molded coupling lens of claim 1, wherein the first optical surface is applied with a correction for an optical error caused at the time of molding.

4. The molded coupling lens of claim 3, wherein the correction for the optical error is a correction for astigmatism.

5. The molded coupling lens of claim 1, wherein the molded coupling lens is shaped to change the divergent angle of a light flux emitted from a semiconductor laser generator.

6. The molded coupling lens of claim 1, wherein the maximum divergent angle $\theta 1$ of a light flux emitted from a tight source to the molded coupling lens is larger than the maximum divergent angle $\theta 2$ of a light flux emitted from a light source to the molded coupling lens, wherein the maximum divergent angle $\theta 1$ is angles on a plane perpendicular to the flat surface and the maximum divergent angle $\theta 2$ is angles on a plane parallel to the flat surface.

* * * * *

UNITED STATES PATENT AND TRADEMARK OFFICE
CERTIFICATE OF CORRECTION

PATENT NO. : 6,791,763 B2
DATED : September 14, 2004
INVENTOR(S) : Hiroyuki Hattori et al.

It is certified that error appears in the above-identified patent and that said Letters Patent is hereby corrected as shown below:

Column 10,
Line 9, "tight" should read -- light --.

Signed and Sealed this

Seventeenth Day of May, 2005

JON W. DUDAS
*Director of the United States Patent and Trademark Office*